United States Patent
Turner

(10) Patent No.: US 6,953,398 B1
(45) Date of Patent: Oct. 11, 2005

(54) CHOPPING BLADE

(75) Inventor: Darrel Lee Turner, Reeseville, WI (US)

(73) Assignee: Fisher Barton Blades, Inc., Watertown, WI (US)

( * ) Notice: Subject to any disclaimer, the term of this patent is extended or adjusted under 35 U.S.C. 154(b) by 14 days.

(21) Appl. No.: 10/412,069

(22) Filed: Apr. 11, 2003

Related U.S. Application Data

(60) Provisional application No. 60/372,167, filed on Apr. 12, 2002.

(51) Int. Cl.⁷ .................................................. A01F 12/40
(52) U.S. Cl. .............................. 460/112; 56/294; 56/504
(58) Field of Search .......................... 460/112; 56/294, 56/564, DIG. 17, 249, 251; 241/243

(56) References Cited

U.S. PATENT DOCUMENTS

| | | | |
|---|---|---|---|
| 2,640,309 A | 6/1953 | Benson | |
| 2,786,322 A | 3/1957 | McEvers | |
| 2,863,162 A | 12/1958 | Draughon | |
| 2,990,667 A | 7/1961 | Schwalm | |
| 3,080,697 A | 3/1963 | Mauro | |
| 3,097,468 A | 7/1963 | Johnson | |
| 3,191,371 A | 6/1965 | Brewer | |
| 3,302,377 A | 2/1967 | Ely | |
| 3,309,854 A | 3/1967 | Mitchell et al. | |
| 3,340,682 A | 9/1967 | Ely | |
| 3,599,412 A | 8/1971 | Lefeuvre | |
| 3,657,869 A | * 4/1972 | Ayranto | 56/294 |
| 3,670,739 A | 6/1972 | Rowland-Hill | |
| 3,678,671 A | 7/1972 | Scarnato et al. | |
| 3,693,335 A | 9/1972 | Mathews | |
| 3,744,725 A | 7/1973 | Grataloup | |
| 3,769,784 A | 11/1973 | Jones | |
| 3,869,848 A | 3/1975 | Larsen | |
| 3,958,402 A | 5/1976 | Bouet | |
| 4,214,426 A | 7/1980 | Lindblad | |
| 4,292,795 A | 10/1981 | Linn | |
| 4,567,716 A | 2/1986 | Makofka et al. | |
| 4,591,102 A | 5/1986 | Clarke | |
| 4,612,941 A | 9/1986 | Kunde | |
| 4,628,672 A | 12/1986 | Jones | |
| 4,631,910 A | 12/1986 | Doyen et al. | |
| 4,637,406 A | 1/1987 | Guinn et al. | |
| 4,691,507 A | 9/1987 | Schwitters | |
| 4,892,504 A | 1/1990 | Scott et al. | |
| 4,936,884 A | 6/1990 | Campbell | |
| 4,938,012 A | 7/1990 | Klima | |
| 4,998,679 A | 3/1991 | Bender | |
| 5,033,259 A | 7/1991 | Adcock | |
| 5,042,973 A | 8/1991 | Hammarstrand | |

(Continued)

FOREIGN PATENT DOCUMENTS

| | | |
|---|---|---|
| DE | 2155170 | 5/1973 |
| DE | 36 26 456 A1 | 11/1987 |
| GB | 2 036 524 | 7/1980 |
| GB | 2 088 685 | 11/1981 |
| NL | 89011 | 2/1957 |

*Primary Examiner*—Árpád Fábián Kovács
(74) *Attorney, Agent, or Firm*—Michael Best & Friedrich LLP

(57) ABSTRACT

A chopping blade includes a mounting portion defining a mounting plane, and a working portion connected to the mounting portion. The working portion includes a leading edge, a trailing edge, and a body extending between the leading edge and the trailing edge. The body includes a first surface adjacent the leading edge and at least partially oriented at a first angle relative to the mounting plane, a second surface adjacent the trailing edge and at least partially oriented at a second angle relative to the mounting plane, and an intermediate surface extending between the first and second surfaces. The intermediate surface has a first portion extending from the first surface at an angle relative to the mounting plane that is steeper than the first angle, and a second portion extending from the second surface and joining with the first portion to form a peak.

29 Claims, 5 Drawing Sheets

U.S. PATENT DOCUMENTS

| | | |
|---|---|---|
| 5,199,251 A | 4/1993 | Rouse et al. |
| 5,209,052 A | 5/1993 | Carroll |
| 5,232,405 A | 8/1993 | Redekop et al. |
| 5,284,006 A | 2/1994 | Sheldon |
| 5,482,508 A | 1/1996 | Redekop et al. |
| 5,622,035 A | 4/1997 | Kondo et al. |
| 5,661,962 A | 9/1997 | Monaco |
| 5,701,728 A | 12/1997 | Koka et al. |
| 5,761,816 A | 6/1998 | Morabit et al. |
| 5,791,131 A | 8/1998 | Hill et al. |
| 5,996,233 A | 12/1999 | Morabit et al. |
| 6,112,416 A | 9/2000 | Bridges et al. |
| 6,301,868 B1 | 10/2001 | Siplinger |
| 2003/0221404 A1 * | 12/2003 | Hancock et al. ............... 56/255 |

* cited by examiner

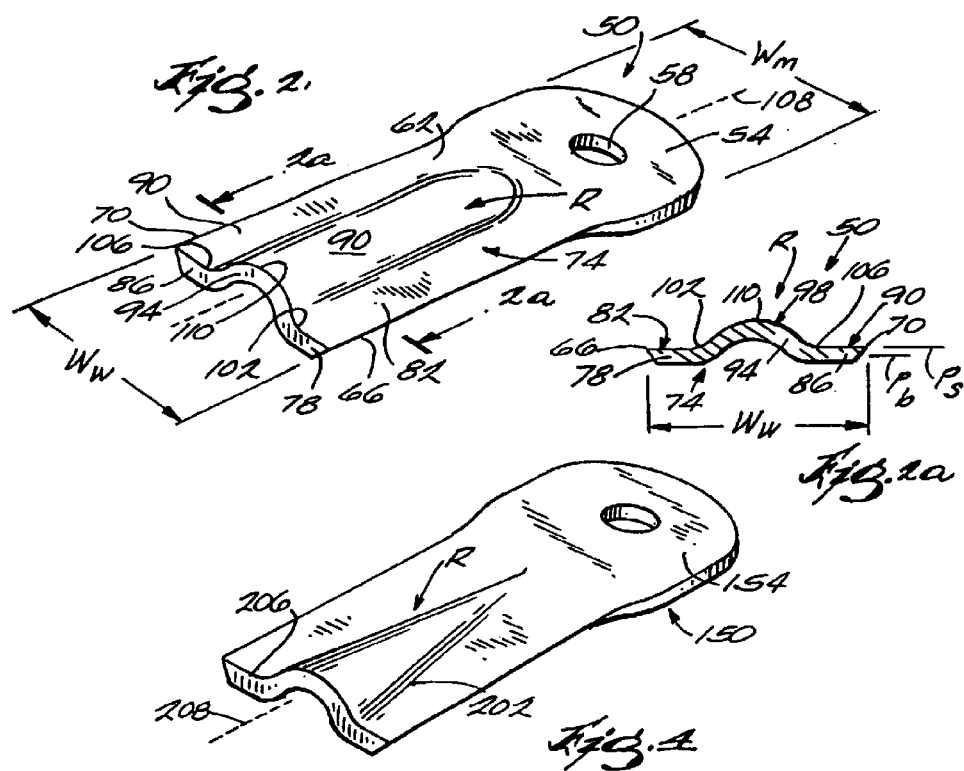
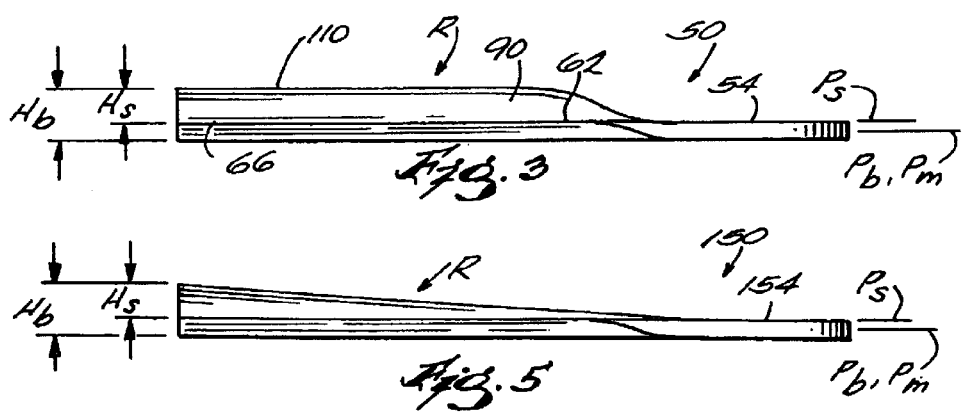

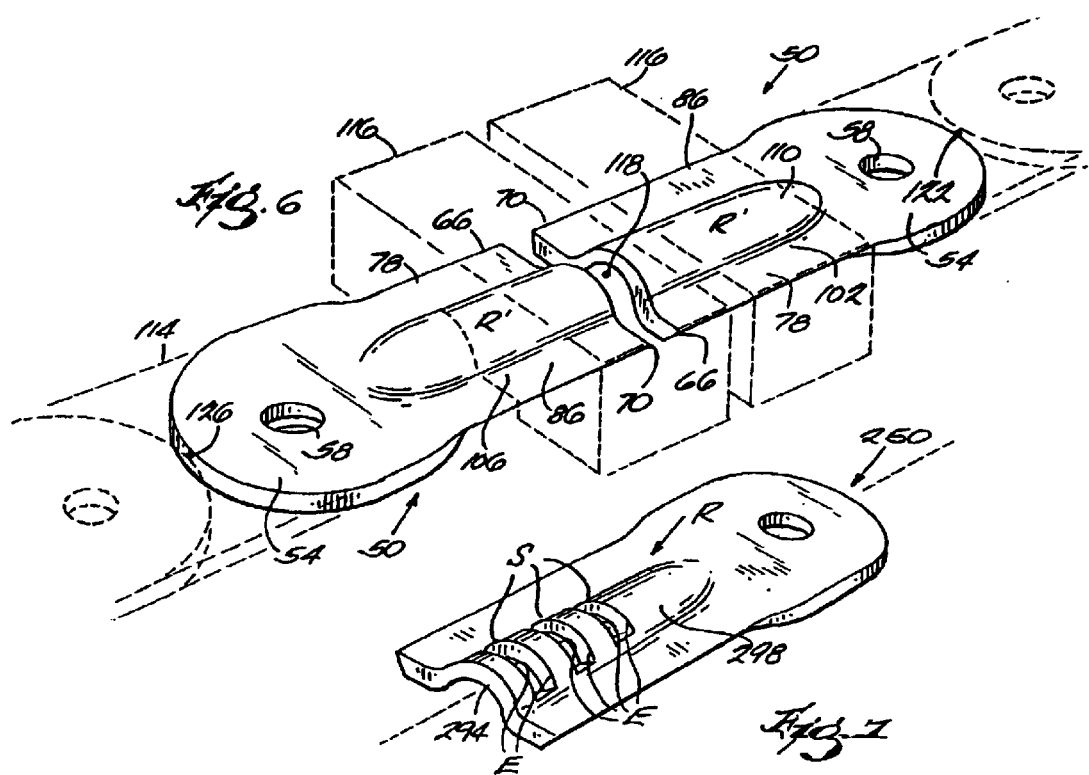

CHOPPING BLADE

RELATED APPLICATIONS

This application claims priority to U.S. Provisional Application No. 60/372,167 filed Apr. 12, 2002.

FIELD OF THE INVENTION

The invention relates to chopping blades, and more particularly to chopping blades used in combines and other agricultural equipment.

BACKGROUND OF THE INVENTION

Combines are used to chop straw, wheat, soybean, corn, and other residue after harvest for collection or spreading over the field. Chopping blades are employed to both cut and spread the residue. FIG. 1 illustrates a prior art chopping blade 10 sometimes referred to as a paddle-type blade. The blade 10 includes a leading edge 14 and a trailing edge 18. The trailing edge 18 is formed up to define a paddle portion 22. The paddle portion 22 increases the airflow as the blade 10 rotates, thereby improving discharge and spreading capabilities.

SUMMARY OF THE INVENTION

The invention provides an improved chopping blade that overcomes some or all of the deficiencies with prior art paddle-type chopping blades. For example, the position of the paddle portion adjacent the trailing edge of a prior art paddle-type blade creates a bending moment that twists the blade at the mounting hole. Under severe conditions, blades may fail by fatigue at the mounting hole, in part due to this bending force.

Additionally, in prior art paddle-type blades, wear may occur at the inside bend line radius of the paddle portion. Wearing in this location can cause undercutting, that in severe cases, can lead to separation of the paddle portion from the remainder of the blade.

Manufacturing of the prior art paddle-type blades can also be troublesome. During forming, the outermost corner of the formed radius is put into tension in a direction parallel to the grain flow of the material. When stretched in this orientation, the outermost corner of the formed radius can crack.

More specifically, the invention provides a chopping blade having a mounting portion defining a mounting plane, and a working portion connected to the mounting portion. The working portion includes a leading edge, a trailing edge, and a body extending between the leading edge and the trailing edge. The body includes a first surface adjacent the leading edge and at least partially oriented at a first angle relative to the mounting plane, a second surface adjacent the trailing edge and at least partially oriented at a second angle relative to the mounting plane, and an intermediate surface extending between the first and second surfaces. The intermediate surface has a first portion extending from the first surface at an angle relative to the mounting plane that is steeper than the first angle, and a second portion extending from the second surface and joining with the first portion to form a peak.

In one aspect of the invention, the first and second angles are substantially the same. In another aspect of the invention, the second portion extends from the second surface at an angle relative to the mounting plane that is steeper than the second angle.

The invention also provides a chopping blade including a leading edge, a trailing edge, and a body extending between the leading edge and the trailing edge. The body includes a first surface adjacent the leading edge and lying substantially in a first plane, a second surface adjacent the trailing edge and lying substantially in the first plane, and an intermediate surface extending between the first and second surfaces. At least a portion of the intermediate surface deviates from the first plane.

In one aspect of the invention, the blade defines a longitudinal axis, and the intermediate surface can be substantially symmetrical about the longitudinal axis. In another aspect of the invention, the intermediate surface can be substantially U-shaped in a cross-section taken substantially perpendicular to the longitudinal axis. In yet another aspect of the invention, the blade has a working portion with an overall width $W_w$ in a direction extending from the leading edge to the trailing edge, and each of the first, second, and intermediate surfaces comprise at least about one fourth of the overall width $W_w$.

In an additional aspect of the invention, the intermediate surface includes one or more slots formed therein. The slots can be substantially perpendicular to the longitudinal axis.

In another aspect of the invention, the intermediate surface includes a first end adjacent the first surface where the intermediate surface deviates from the first plane, and a second end adjacent the second surface where the intermediate surface deviates from the first plane. The first and second ends of the intermediate surface can be substantially parallel to the longitudinal axis, or can be angled with respect to the longitudinal axis.

In yet another aspect of the invention, the intermediate surface defines a peak spaced at a height $H_s$ from the first plane. The height $H_s$ can be substantially constant in the direction of the longitudinal axis, or can vary in the direction of the longitudinal axis.

In a further aspect of the invention, the blade further includes a mounting hole and a reinforcing rib around at least a portion of the mounting hole. The blade can include a mounting portion having an overall width $W_m$, such that the overall width $W_m$ of the mounting portion is greater than the overall width $W_w$ of the working portion.

The invention further provides a method of manufacturing chopping blades having a leading edge, a trailing edge, and a body extending between the leading edge and the trailing edge. The method includes providing a substantially planar blank of blade material having a first end, a second end, and an intermediate point between the first and second ends, at least partially constraining the blank on both sides of the intermediate point, forming a rib in the blank in an area where the blank is constrained, and separating the blank adjacent the intermediate point to form two chopping blades, each chopping blade including a portion of the formed rib.

In one aspect of the invention, constraining the blank includes placing the blank in one or more die blocks to constrain the blank in an area ultimately defining at least portions of the leading edges and trailing edges of the two chopping blades. In another aspect of the invention, the method further includes forming at least one slot in the rib. In yet another aspect of the invention, providing the substantially planar blank of blade material includes feeding the blade material from a coil of blade material.

Other features and advantages of the invention will become apparent to those skilled in the art upon review of the following detailed description, claims, and drawings.

BRIEF DESCRIPTION OF THE DRAWINGS

FIG. 2 is perspective view of a chopping blade embodying the invention.

FIG. 2a is a section view taken through line 2a—2a of FIG. 2.

FIG. 2b is an enlarged view of FIG. 2a.

FIG. 3 is a side view of the chopping blade of FIG. 2.

FIG. 4 is a perspective view of another chopping blade embodying the invention.

FIG. 5 is a side view of the chopping blade of FIG. 4.

FIG. 6 is a perspective view illustrating a portion of a manufacturing process that can be used for manufacturing the chopping blade of FIG. 2.

FIG. 7 is a perspective view of a chopping blade similar to the chopping blade of FIG. 2, shown with a plurality of slots formed therein.

FIG. 8 is a perspective view, partially broken away, of another chopping blade embodying the invention.

FIG. 9 is a perspective view, partially broken away, of yet another chopping blade embodying the invention.

Figure 1:
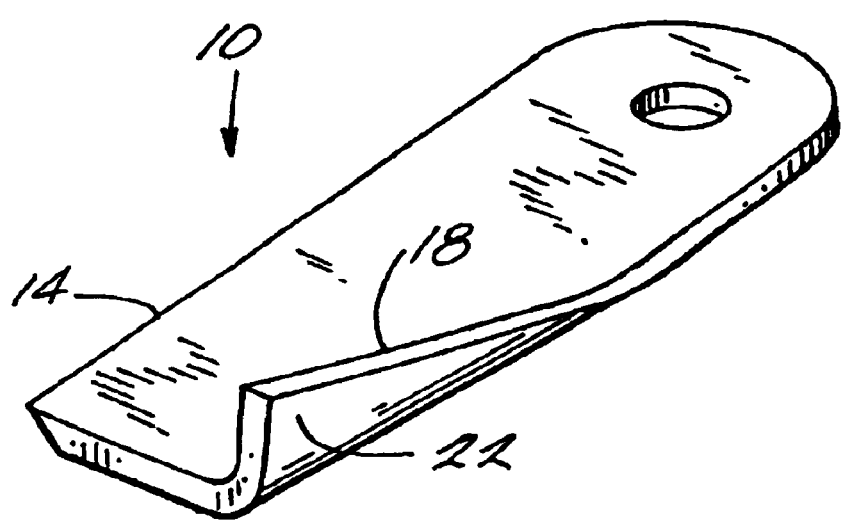
FIG. 1 is a perspective view of a prior art paddle-type chopping blade.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIGS. 2, 2a, 2b, and 3 illustrate a first embodiment of a chopping blade 50 of the invention. The blade 50 is designed for use on a combine or other similar agricultural equipment used for chopping and spreading agricultural residue, but can also be used in other applications.

The blade 50, as well as the other blade embodiments described below, can be made from any suitable material, such as spring grade steel, and is preferably AISI 10B38 grade steel sold under the trademark MARBAIN and available from Fisher Barton Blades, Inc. of Watertown, Wis. Of course, other grades of steel can also be successfully used. For example, the blade 50 can be made of any of a group of materials including the following grades of heat treatable, plain carbon or alloy steels: 1074 annealed steel; AISI 5140 through 5160; 51B35 through 51B60; 5135H through 5160H; 6150 and 6150H; 4140 through 4161; 4141H through 4161H; 9255 through 9260; 9255H through 9260H; 1541 through 1566; 15B30 through 15B41; 15B35H through 15B62H; 1037 through 1095; and 10B37 through 10B60, as well as other equivalent chemistries.

The blade 50 includes a mounting portion 54 lying in a mounting plane $P_m$ and having a mounting hole 58 for securing the blade 50 to a rotating member or rotor (not shown). The blade 50 also includes a working portion 62 extending from the mounting portion 54. While not shown, the mounting portion 54 and the working portion 62 could be offset from one another (in a vertical direction when viewed with respect to FIG. 3), as is known, to accommodate for different rotor mounts and stationary blade positions. The blade 50 further includes a leading or cutting edge 66 and a trailing edge 70. As will be described further below, it is to be understood that the leading edge 66 and the trailing edge 70 can be reversed depending upon the direction of rotation of the blade 50. In the illustrated embodiment, at least a portion of the leading edge 66 and the trailing edge 70 are beveled for improved cutting performance, however, different cutting edge configurations can also be used. For example, the edges 66, 70 can have different bevel configurations or need not be beveled at all. Additionally the edges 66, 70 can include serrations (not shown).

The working portion 62 defines a blade body 74 that extends between the leading and trailing edges 66, 70. Referring to FIG. 2a, the blade body 74 includes a first body portion 78 adjacent the leading edge 66 and lying substantially in a first body plane $P_b$. For purposes of illustration only, the first body plane $P_b$ is shown as passing approximately through the midpoint of the material thickness of the blade 50, and is substantially co-planar with the mounting plane $P_m$. Note that if the mounting portion 54 and the working portion 62 are offset from one another, the mounting plane $P_m$ and the body plane $P_b$ would not necessarily be coplanar. The first body portion 78 defines a first surface 82 lying substantially in a first surface plane $P_s$.

The blade body 74 also includes a second body portion 86 adjacent the trailing edge 70 and lying substantially in the first body plane $P_b$. The second body portion 86 defines a second surface 90 lying substantially in the first surface plane $P_s$. As will be described below, those skilled in the art will understand that in other embodiments, the first and second body portions 78, 86, and the corresponding first and second surfaces 82, 90, need not lie substantially in the respective planes $P_b$, $P_s$.

The blade body 74 further includes an intermediate body portion 94 extending between the first and second body portions 78, 86. The intermediate body portion 94 defines an intermediate surface 98 extending between the first and second surfaces 82, 90. In the illustrated embodiment, the intermediate body portion 94 defines a rib or formation (indicated generally by the letter R) that deviates from the first body plane $P_b$. Likewise, the intermediate surface 98 defines the rib R and deviates from the first surface plane $P_s$. The rib R is configured to improve, among other things, airflow around the blades in the combine to improve the discharge and spreading capabilities of the blades 50. While the rib R is illustrated as being formed via a deviation in the substantially homogenous thickness of the blade body 74, it is to be understood that the rib R could also be formed by adding to the material thickness of the blade body 74 in the intermediate body portion 94 to achieve the same configuration of the intermediate surface 98. Alternatively, the rib R could be formed by removing material from the first and second body portions 78, 86.

As shown in FIG. 2a, the rib R, the intermediate body portion 94, and the intermediate surface 98 each have a first end 102 adjacent the first body portion 78 and a second end 106 adjacent the second body portion 86. In the illustrated embodiment, the first and second ends 102, 106 are where the intermediate body portion 94 deviates from the first body plane $P_b$ and where the intermediate surface 98 deviates from the first surface plane $P_s$. As shown in FIG. 2, the first and second ends 102 and 106 extend generally parallel to a longitudinal axis 108 of the blade 50.

The rib R, the intermediate body portion 94, and the intermediate surface 98 each also define an apex or peak 110 between the first and second ends 102 and 106 and extending generally parallel to and coaxially with the longitudinal axis 108. The contour of the rib R is substantially symmetrical about the peak 10 and therefore, the rib R, the intermediate body portion 94, and the intermediate surface 98 are all substantially centered on and symmetrical about the longitudinal axis 108. This helps provide a blade 50 that is substantially balanced, thereby reducing or eliminating bending moments and torque at the mounting hole 58 that may otherwise fatigue the material surrounding the mounting hole 58.

Additionally, the symmetry of the blade 50 makes the blade 50 reversible in terms of direction of rotation. This facilitates assembly over prior art paddle-type chopping blades, where care had to be taken to be sure the right-hand and left-hand blades were appropriately selected and mounted. Another benefit of the reversible blades 50 is that when the plurality of blades 50 mounted along the length of the combine rotor becomes partially worn, the blades 50 can be collectively reversed (both in terms of direction of rotation and position on the rotor) so that the trailing edges 70 in the previous orientation become the new leading edges 66. Provided that the blades 50 wore substantially uniformly in their reversed orientations, the rotor should remain within balance tolerance ranges. This may delay or eliminate the need for additional dynamic balancing of the rotors.

As shown in FIGS. 2, 2a, and 3, the rib R, the intermediate body portion 94, and the intermediate surface 98 are substantially U-shaped in a cross-section taken substantially perpendicular to the longitudinal axis 108. In one embodiment, the transition beginning at each of the first and second ends 102 and 106 is defined by a radius in the intermediate surface of about 0.3 to 0.5 inches. Similarly, the radius defining the underside of the rib R adjacent the peak 10 is about 0.3 to 0.5 inches. Depending on the specific radii, the angle between portions of the first surface 82 and portions of the intermediate surface 98 between the first end 102 and the peak 10 can be about 90 degrees and higher. Likewise, the angle between portions of the second surface 90 and portions of the intermediate surface 98 between the second end 106 and the peak 110 can be about 90 degrees and higher.

As shown in FIG. 3, the peak 10 is spaced from the first surface plane $P_s$ by a height $H_s$, and from the first body plane $P_b$ by a height $H_b$. The heights $H_s$ and $H_b$ remain substantially constant in the direction of the longitudinal axis 108, with only a short transition between the rib R in working portion 62 to the substantially planar mounting portion 54. In one embodiment, the heights $H_s$ and $H_b$ fall within a range from about 0.5 to 1.0 inches, and more preferably are about 0.67 and 0.73 inches, respectively.

The specific dimensional characteristics of the blade 50 are not critical, and can be varied depending on desired airflow characteristics, spreading characteristics, wear characteristics, and horsepower requirements. Additionally, the rib R need not be substantially U-shaped in cross-section, but rather could be substantially V-shaped or other suitable shapes instead.

In addition to being substantially symmetrical, and therefore more balanced than prior art paddle-type blades, the blade 50 also substantially reduces the possibility that a formed-up portion of the blade 50 may be separated from the remainder of the blade 50 due to undercutting wear. Specifically, any undercutting wear that may, under severe conditions, separate the first body portion 78 from the intermediate body portion 94 adjacent the first edge 102 will not result in the intermediate body portion 94 becoming completely detached from the remainder of the blade 50. Rather, the connection between the intermediate body portion 94 and the second body portion 86 on the downstream side of the rib R will hold the undercut rib R in position.

The blade 50 is also more efficient than prior art paddle-type blades because the radius of the peak 110 and the downstream portion of the rib R helps keep air in laminar flow as the blade rotates. With prior art paddle-type blades, the airflow is more turbulent over the top corner of the paddle portion, creating dead air space at the backside of the paddle. The turbulence and dead air space reduces blade efficiency.

Figure 2B:
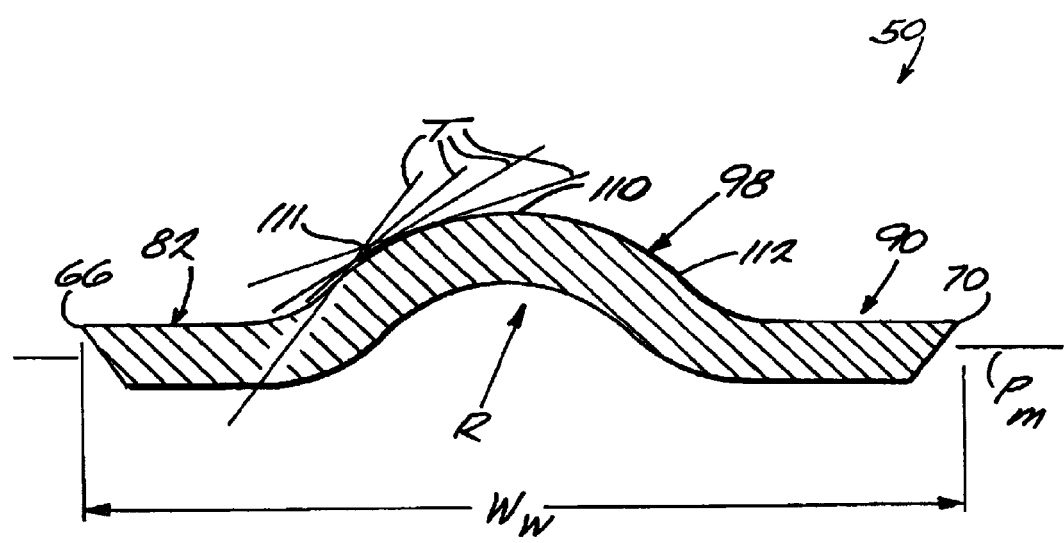
Figure 1:
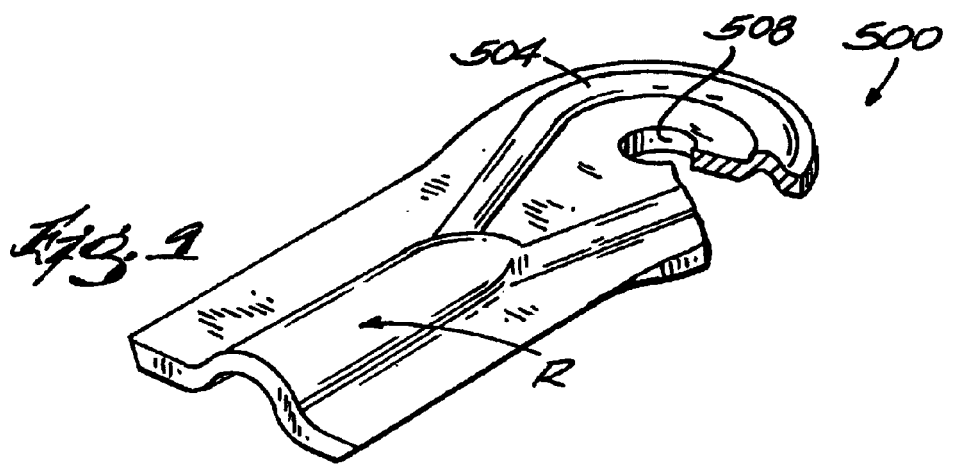

With specific reference to FIG. 2b, the geometry of the blade 50 can be further described in the following manner. The first surface 82 is adjacent the leading edge 66 and is at least partially oriented at a first angle relative to the mounting plane $P_m$. In the illustrated embodiment, the first angle is substantially zero degrees, however, those skilled in the art will understand that the first surface 82 (and also the first body portion 78) can also be angled with respect to the mounting plane $P_m$ at a non-zero angle. Likewise, the second surface 90 is adjacent the trailing edge 70 and is at least partially oriented at a second angle relative to the mounting plane $P_m$. In the illustrated embodiment, the second angle is substantially zero degrees like the first angle, however, those skilled in the art will understand that the second surface 90 (and also the second body portion 86) can also be angled with respect to the mounting plane $P_m$ at a non-zero angle. Furthermore, the first and second angles could be different non-zero angles.

The intermediate surface 98 further defines a first portion 111 extending from the first surface 82 at an angle relative to the mounting plane $P_m$ that is steeper than the first angle. As used herein and in the appended claims, the angles formed between two references (e.g., the mounting plane $P_m$ and the first portion 111) refer to the angles formed between tangent lines of a point or points on the particular reference. For example, tangent lines T are illustrated at various points along the first portion 111. At least some, if not all, of the tangent lines T form angles with respect to the mounting plane $P_m$ that are steeper than the first angle, which is zero degrees in FIG. 2b.

The intermediate surface 98 also defines a second portion 112 extending from the second surface 90 and joining with the first portion 111 at the peak 10.

In the illustrated embodiment, the second portion 112 also extends from the second surface 90 at an angle relative to the mounting plane $P_m$, that is steeper than the second angle.

Using this description of the blade and rib geometry, in terms of relative angles between various surface portions, and the joining of the first and second intermediate surface portions 111, 112 at the apex 110, those skilled in the art will understand how the blade 50 can be modified from the illustrated embodiment without deviating from the scope of the invention.

Because of the geometry of the blade 50, as described above, and the method of manufacturing the blade 50, as described below, the working portion 62 preferably has an overall width $W_w$ that can be generally wider than the overall width of prior art paddle-type blades. To achieve this overall wider working portion 62, a wider blank of material is used to form the blade 50. After forming the blade 50, the mounting portion 54 has an overall width $W_m$ that is greater than the overall width $W_w$ of the working portion 62. The added width of the mounting portion 54 also helps reduce the torque on the mounting hole 58. As seen in FIGS. 2, 2a, and 2b, the first, second, and intermediate body portions 78, 86, 94, and their respective surfaces 82, 90, 98, each comprise at least about one fourth of the overall width $W_w$ of the working portion 62.

The blade 50 can be made using conventional fabrication processes such as, for example, stamping, coining, shearing, grinding, shaving, or milling, or by a combination of these processes according to design requirements. FIG. 6 illustrates a manufacturing process of one embodiment, wherein a continuous, substantially planar blank of material (indicated generally by the reference numeral 114) is fed from a coil or roll of material to form the ribs R of two blades 50 in a single cold forming operation. Alternatively, long pieces of plate stock can be used. The blank 114 is fed to a position where it is constrained by one or more die blocks 116 on either side of an intermediate point 118 that defines a future separation location between first and second blank ends 122, 126, respectively. The first blank end 122 defines one end of a first blade 50, and the second blank end 126 defines one end of a second blade 50. The blank 114 is constrained such that the areas of the blank 114 that will ultimately form the leading and trailing edges 66, 70, and the first and second body portions 78, 86 will not be deformed from the generally planar geometry during the stamping process.

With the blank 114 constrained, a single stamping action forms one long rib R' that is substantially symmetrical about the intermediate point 118. Only after the single stamping action are the two individual working portions 62 formed by separating or parting the blank 114 at the intermediate point 118. By using the method illustrated in FIG. 6, the likelihood of cracks forming at the distal end of the individual ribs R adjacent the peak 110, the first end 102, and the second end 106 is reduced or eliminated. This enables the blades 50 to be formed while keeping the material width, and therefore the blade weight, cost effective.

The mounting holes 58 can be formed either before or after the stamping process. The processes to round the mounting portions 54 and to separate or part adjacent mounting portions 54 at the first and second blank ends 122, 126 preferably occurs after the stamping process. Those skilled in the art will understand that the process illustrated in FIG. 6 can be modified to use individual blanks sized to form two blades 50 at a time, instead of a single blank 114 that is continuously fed from a roll, coil, or piece of plate stock. In other words, individual blanks 114 can be cut from a coil or roll of blade material at the first and second blank ends 122, 126 before the blank 114 is constrained and stamped.

FIGS. 4 and 5 illustrate another embodiment of the invention. The chopping blade 150 is substantially the same as the blade 50 with the following exceptions. First, as best seen in FIG. 4, the first and second ends 202, 206 of the rib R, the intermediate body portion 194, and the intermediate surface 198 extend at an angle with respect to the longitudinal axis 208. This creates a rib R that widens in a direction away from the mounting portion 54. Such a rib configuration can be beneficial depending on the desired airflow characteristics of the blade 150. The specific angle of the ends 202, 206 with respect to the longitudinal axis 208 can be adjusted as desired. Of course, the rib R could also be formed so as to narrow in a direction away from the mounting portion 54 by changing the angles of the ends 202, 206 with respect to the longitudinal axis 208. FIG. 8 illustrates at least a partial narrowing of the rib R in a direction away from the mounting portion.

Second, as best seen in FIG. 5, the heights $H_s$ and $H_b$ vary in the direction of the longitudinal axis 208, as opposed to remaining substantially constant. Specifically, the heights $H_s$ and $H_b$ increase in a direction away from the mounting portion 154. The tip speed of the blade 150 is greatest at the end of the blade 150 furthest from the mounting portion 154, and the greater the tip speed, the better the residue spreading capability. By having the heights $H_s$ and $H_b$ increase toward the end of the blade 150 that is furthest from the mounting portion 154, residue spreading can be maximized, yet horsepower requirements can be minimized as there is less need for the full height of the rib R closer toward the mounting portion 154. The specific taper angle chosen for the varying the heights $H_s$ and $H_b$ can be selected as desired. Of course, the rib R could also taper in the reverse manner, with the heights $H_s$ and $H_b$ decreasing toward the end of the blade 150 that is furthest from the mounting portion 154.

It should also be noted that the two differences discussed with respect to the blade 150 can be applied separately. For example, the rib R of the blade 50 could be altered to have either a tapering height or a tapering width. The blade 150 can be made in a similar manner to the blade 50, by changing the tooling for the stamping process described above.

FIG. 7 illustrates another embodiment of the invention. The chopping blade 250 is substantially the same as the blade 50 except that the rib R, the intermediate body portion 294, and the intermediate surface 298 include at least one, and preferably a plurality, of slots S. The slots S are illustrated as being substantially perpendicular to the longitudinal axis 308, however, this need not be the case. The slots S define additional cutting edges E that can facilitate the cutting and shredding action of the blade 250. The slots can be sized and spaced as desired to achieve the desired mix of shredding characteristics and airflow characteristics.

FIGS. 8–11 illustrate various blade embodiments of the invention that include a reinforcing rib extending around at least a portion of the mounting portion, and therefore around at least a portion of the mounting hole. The reinforcing ribs help strengthen the mounting portions and the mounting holes of the respective blades.

FIG. 8 illustrates a blade 450 where the rib R branches into two reinforcing rib portions 454 that extend into the mounting portion 458 and at least partially around the mounting hole 462. The blade 450 can be made in a similar manner to the blade 50, by changing the tooling for the stamping process described above.

FIG. 9 illustrates a blade 500 where the reinforcing rib 504 extends from the rib R and completely encircles the mounting hole 508. The blade 500 can be made in a similar manner to the blade 50, by changing the tooling for the stamping process described above.

Figure 10:
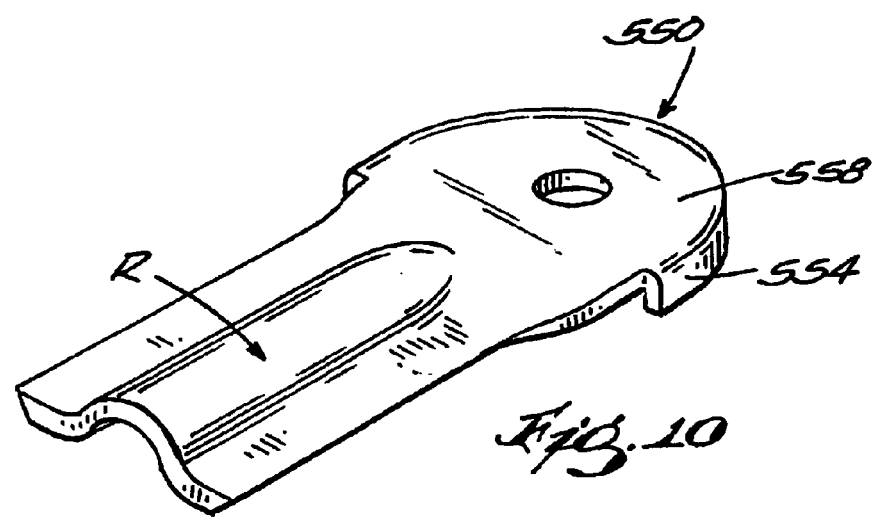
FIG. 10 is a perspective view of yet another chopping blade embodying the invention.

FIG. 10 illustrates a blade 550 where the reinforcing rib 554 is in the form of a flange around at least part of the perimeter of the mounting portion 558 and extending substantially perpendicularly to the remainder of the mounting portion 558. The reinforcing rib 554 can be formed using any suitable forming technique.

Figure 11:
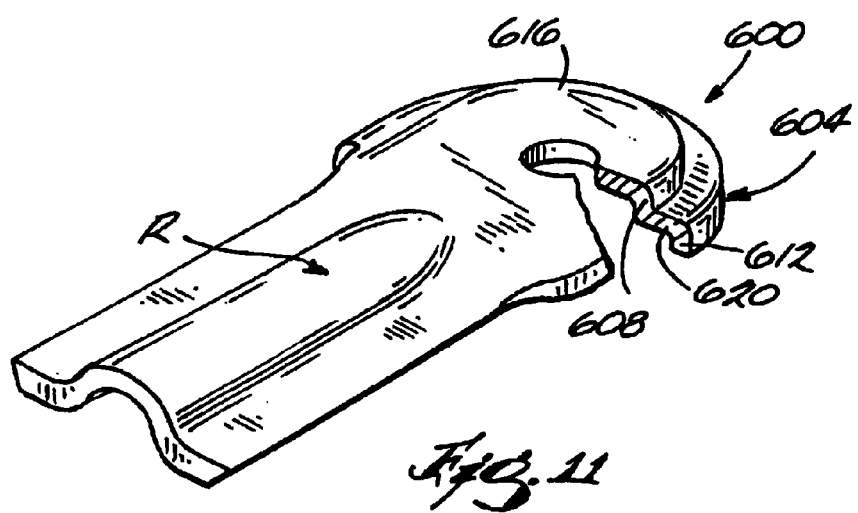
FIG. 11 is a perspective view, partially broken away, of yet another chopping blade embodying the invention.

FIG. 11 illustrates a blade 600 where the reinforcing rib 604 is in the form a stepped flange having a first and second flange portions 608 and 612 extending substantially perpendicularly to the remainder of the mounting portion 616. An intermediate flange portion 620 extends substantially parallel to the remainder of the mounting portion 616 between the first and second flange portions 608 and 612. The reinforcing rib 604 can be formed using any suitable forming technique.

Various features of the invention are set forth in the following claims.

What is claimed is:

1. A chopping blade comprising:
    a mounting portion defining a mounting plane; and
    a working portion connected to the mounting portion, the working portion including
        a leading edge;
        a trailing edge; and
        a body extending between the leading edge and the trailing edge, the body having
            a first surface adjacent the leading edge and at least partially oriented at a first angle relative to the mounting plane;
            a second surface adjacent the trailing edge and at least partially oriented at a second angle relative to the mounting plane; and
            an intermediate surface extending between the first and second surfaces, the intermediate surface having a first portion extending from the first surface at an angle relative to the mounting plane that is steeper than the first angle, and a second portion extending from the second surface and joining with the first portion to form a peak, the intermediate surface further including a plurality of slots formed therein.

2. The chopping blade of claim 1, wherein the first and second angles are substantially the same.

3. The chopping blade of claim 1, wherein the second portion extends from the second surface at an angle relative to the mounting plane that is steeper than the second angle.

4. The chopping blade of claim 1, wherein the first surface lies substantially in a surface plane, the second surface lies substantially in the surface plane, and the intermediate surface deviates from the surface plane.

5. The chopping blade of claim 1, wherein the intermediate surface includes a first end adjacent the first surface, and a second end adjacent the second surface, wherein the blade defines a longitudinal axis, and wherein the first and second ends of the intermediate surface are substantially parallel to the longitudinal axis.

6. The chopping blade of claim 1, wherein the intermediate surface includes a first end adjacent the first surface, and a second end adjacent the second surface, wherein the blade defines a longitudinal axis, and wherein the first and second ends of the intermediate surface are angled with respect to the longitudinal axis.

7. The chopping blade of claim 1, wherein the blade defines a longitudinal axis, wherein the peak is spaced at a height $H_s$ from a plane containing at least a portion of the first surface, and wherein the height $H_s$ is substantially constant in the direction of the longitudinal axis.

8. The chopping blade of claim 1, wherein the blade defines a longitudinal axis, wherein the peak is spaced at a height $H_s$ from a plane containing at least a portion of the first surface, and wherein the height $H_s$ varies in the direction of the longitudinal axis.

9. The chopping blade of claim 1, wherein the blade defines a longitudinal axis, and wherein the intermediate surface is substantially symmetrical about the longitudinal axis.

10. The chopping blade of claim 1, wherein the blade defines a longitudinal axis, and wherein the intermediate surface is substantially U-shaped in a cross-section taken substantially perpendicular to the longitudinal axis.

11. The chopping blade of claim 1, wherein the working portion has an overall width $W_w$ in a direction extending from the leading edge to the trailing edge, and wherein each of the first, second, and intermediate surfaces comprise at least about one fourth of the overall width $W_w$.

12. The chopping blade of claim 1, wherein the blade defines a longitudinal axis, and wherein the slots are substantially perpendicular to the longitudinal axis.

13. The chopping blade of claim 1, wherein the blade further includes a mounting hole and a reinforcing rib around at least a portion of the mounting hole.

14. The chopping blade of claim 1, wherein the working portion has an overall width $W_w$, the mounting portion has an overall width $W_m$, and wherein the overall width $W_m$ of the mounting portion is greater than the overall width $W_w$ of the working portion.

15. The chopping blade of claim 1, wherein an angle between the first surface and the first portion of the intermediate surface is greater than 90 degrees to facilitate airflow over the intermediate surface.

16. The chopping blade of claim 1, wherein the first surface is defined on a first body portion, the second surface is defined on a second body portion, and the intermediate surface is defined on an intermediate body portion, each of the first, second, and intermediate body portions having substantially the same thickness.

17. The chopping blade of claim 1, wherein the first and second portions of the intermediate surface are generally curved.

18. The chopping blade of claim 1, wherein the peak is generally rounded.

19. A chopping blade comprising:
    a leading edge;
    a trailing edge; and
    a body extending between the leading edge and the trailing edge, the body having
        a first body portion adjacent the leading edge and lying substantially in a first plane;
        a second body portion adjacent the trailing edge and lying substantially in the first plane; and
        an intermediate body portion extending between the first and second body portions, wherein at least a portion of the intermediate body portion deviates from the first plane, and wherein the intermediate body portion includes a plurality of slots formed therein;
    wherein the body has a substantially uniform thickness and wherein the deviation of the intermediate body portion from the first plane defines a rib.

20. The chopping blade of claim 19, wherein the blade defines a longitudinal axis, and wherein the intermediate body portion is substantially symmetrical about the longitudinal axis.

21. The chopping blade of claim 19, wherein the blade defines a longitudinal axis, and wherein the intermediate body portion is substantially U-shaped in a cross-section taken substantially perpendicular to the longitudinal axis.

22. The chopping blade of claim 19, wherein the blade has a working portion with an overall width $W_w$ in a direction extending from the leading edge to the trailing edge, and wherein each of the first, second, and intermediate body portions comprise at least about one fourth of the overall width $W_w$.

23. The chopping blade of claim 19, wherein the blade defines a longitudinal axis, and the slots are substantially perpendicular to the 24. The chopping blade of claim 19, wherein the intermediate body portion includes a first end adjacent the first body portion where the intermediate body portion deviates from the first plane, and a second end adjacent the second body portion where the intermediate body portion deviates from the first plane, wherein the blade defines a longitudinal axis, and wherein the first and second ends of the intermediate body portion are substantially parallel to the longitudinal axis.

25. The chopping blade of claim 19, wherein the intermediate body portion includes a first end adjacent the first body portion where the intermediate body portion deviates from the first plane, and a second end adjacent the second body portion where the intermediate body portion deviates from the first plane, wherein the blade defines a longitudinal axis, and wherein the first and second ends of the intermediate body portion are angled with respect to the longitudinal axis.

26. The chopping blade of claim 19, wherein the blade defines a longitudinal axis, wherein the intermediate body portion defines a peak spaced at a height $H_s$ from the first plane, and wherein the height $H_s$ is substantially constant in the direction of the longitudinal axis.

27. The chopping blade of claim 19, wherein the blade defines a longitudinal axis, wherein the intermediate body portion defines a peak spaced at a height $H_s$ from the first plane, and wherein the height $H_s$ varies in the direction of the longitudinal axis.

28. The chopping blade of claim 19, wherein the blade further includes a mounting hole and a reinforcing rib around at least a portion of the mounting hole.

29. The chopping blade of claim 19, wherein the blade includes a working portion including the body and having an overall width $W_w$, and a mounting portion connected to the working portion, containing a mounting hole, and having an overall width $W_m$, and wherein the overall width $W_m$ of the mounting portion is greater than the overall width $W_w$ of the working portion.

* * * * *

UNITED STATES PATENT AND TRADEMARK OFFICE
CERTIFICATE OF CORRECTION

PATENT NO. : 6,953,398 B1
DATED : October 11, 2005
INVENTOR(S) : Darrel Lee Turner It is certified that error appears in the above-identified patent and that said Letters Patent is hereby corrected as shown below:

Column 6,
Line 46, "10" should be -- 110 --.

Column 10,
Line 60, after "longitudinal axis, and" insert -- wherein -- and;
Line 61, after "perpendicular to the" insert -- longitudinal axis. --.

Signed and Sealed this

Twenty-first Day of February, 2006

JON W. DUDAS
*Director of the United States Patent and Trademark Office*